United States Patent

[11] 3,620,762

[72] Inventors Teruo Yoshida
  Kanagawa-ken;
  Takaaki Sagara, Kanagawa-ken; Takashi Ojima, Kanagawa-ken; Reiji Takahashi, Kanagawa-ken; Masahiro Takahashi, Tokyo, all of Japan
[21] Appl. No. 836,145
[22] Filed June 24, 1969
[45] Patented Nov. 16, 1971
[73] Assignee Ajinomoto Co., Inc.
  Tokyo, Japan
[32] Priority July 11, 1968
[33] Japan
[31] 43/48687

[54] PROCESS FOR PRODUCING ENRICHED ARTIFICIAL RICE
  5 Claims, No Drawings
[52] U.S. Cl. .......................................................... 99/83,
  99/11
[51] Int. Cl. .......................................................... A23l 1/30,
  A23l 1/10

[50] Field of Search............................................. 99/80, 83

[56] References Cited
  UNITED STATES PATENTS
  2,831,770  4/1958  Antoshkiw ..................  99/11
  2,879,164  3/1959  White et al. ..................  99/14
  OTHER REFERENCES
Kimura "Chemical Abstracts" vol. 52 17559, article entitled "Artificial Rice"
  Bhatia et al., Food Manufacture Sept. 1956, pages 376–380, page 377 relied upon Primary Examiner—Raymond N. Jones
Attorney—Kurt Kelman ABSTRACT: Enriched artificial rice is prepared by kneading together rice powder, nutrients (i.e. amino acids, vitamins, and/or minerals), water, and if desired, a binder (such as carboxymethyl-cellulose); steaming the mixture to semigelatinize the starch contained therein; granulating the resulting viscous product; and, if desired, coating the grains obtained.

PROCESS FOR PRODUCING ENRICHED ARTIFICIAL RICE

This invention relates to artificial rice, and particularly to a method of producing artificial rice.

Artificial rice produced by known processes can only contain about 3–10 percent of enriching materials. Its taste is bad and the quality of cooked rice containing the artificial rice often becomes poor.

The primary object of the invention is a process for producing low-priced and highly enriched artificial rice which does not turn brown by the Maillard reaction in spite of its high content of amino acids, forms good grains and has a taste not different from natural rice when it is cooked mixed with natural rice.

The method of the invention comprises mixing rice powder with a suitable amount of enriching materials and, if desired a binder such as carboxymethylcellulose, kneading the mixture with enough water to make the water content 20–50 percent, heating the kneaded mixture with steam until the starch granules in the rice powder are partially gelatinized, forming the viscous intermediate product into grains on a suitable granulator, and drying the grains with warm air at a temperature below 80° C. to reduce their water content to 5–15 percent.

Suitable raw materials for the production of artificial rice according to the invention include natural rice of the type used for food but also broken rice or powdered rice that are not used for food.

These materials are crushed, if desired, soaked in a 10 percent solution or a saturated solution of enriching materials such as amino acids for several minutes to several hours and shaped into dry grains by a suitable method.

During soaking, the enriching materials pass through the cell membrane of the rice and, as the water content of the rice is reduced suddenly by drying the rice cells become brittle and break on account of a kind of plasmolysis. Rice powder containing 10–15 percent of the enriching materials is obtained, through the content of enriching materials depends on the concentration of the solution in which the rice is soaked. Crushing is not necessary for rice powder; however, the process is very effective when natural rice grains are used.

Suitable enriching minerals include amino acids such as L-lysine, L-threonine, L- or DL-methionine and L- or DL-tryptophan, vitamins such as thiamine, niacin and pyridoxin, and minerals such as calcium phosphate, calcium carbonate, potassium iodide and ferrous sulfate. These enriching materials especially amino acids, may be added in an amount to constitute up to 50 percent of solid matter in the artificial rice. Such a high concentration has not been achieved heretofore.

The powdered material mixed with enriching materials as described above is kneaded with water sufficient to make the water content 20–50 percent. This is enough to semigelatinize the starch granules in the rice powder.

Heating with steam is necessary to semigelatinize the starch granules in the rice powder and a temperature of 90°–120° C. is usually applied. If the heat treatment is more severe, the starch granules are expanded too much and break. However, the conditions for semigelatinizing the rice starch observed as strictly as is necessary with other types of starch (wheat, maize and so on).

The starch product obtained by steam heating is an intermediate of high viscosity which coats the enriching materials. The process makes grain-forming easy and, prevents elution of enriching materials during washing with water.

The grains are formed on a granulator by known methods, for example the roller method (a press method) or the macaroni method. The resulting grains are dried in warm air up to 80° C. for a suitable time until the water content is reduced to 5–15 percent.

The enriched artificial rice produced according to the present process in white and has a lustrous surface, in spite of the high enrichment with amino acids and other nutrients, and the form of its grains is so similar to that of natural rice, that there is no significant difference from natural rice in appearance. When natural rice powder is used as main raw material, forming is very easily accomplished without loss and is economically advantageous as compared to the use of starch or gluten.

The artificial rice may be coated if it is desired to be mixed with natural rice and cooked after soaking in water for a long time.

The enriched artificial rice produced according to the present invention can have good hardness and elasticity, combined with a high content of enriching nutrients and is also resistant to washing and soaking for a long time when coated with a suitable film. Accordingly, this artificial rice can be mixed with natural rice before being cooked. When cooking is finished, its grains are not broken and almost indistinguishable from natural rice in its appearance, viscosity, elasticity and taste.

EXAMPLE 1

In a solution containing 30 percent of L-lysine hydrochloride natural rice was soaked for 10 hours and dried, whereby the rice grains become very brittle. The L-lysine content of the rice after being crushed mechanically was 10.7 percent. To 700 g. of the resulting rice powder containing L-lysine, 140 g. of L-lysine hydrochloride, 100 g. of L-threonine, 20 g. of calcium carbonate and 150 ml. of water were added and the mixture was kneaded for 15 minutes. The starch in the rice powder was semigelatinized by being steamed for 10–20 minutes, the steam material has formed into sheets (water content 27 percent) and formed into grains in a double roller granulator. This forming was done efficiently since the grains produced did not stick to the roller and did not break.

The grains were screened and dried to a water content of 5 percent. The obtained artificial rice could hardly be distinguished from natural rice in its appearance and color, it had a hardness of 15 g., and its taste was good enough even when cooked with natural rice. An alcohol solution containing 34 percent of shellac was sprinkled (30 ml. of the alcohol solution and 5–15 g. of talc were used at one time) over the grains in a pancoating machine, under warm air of 40°–60° C. until the quantity of shellac added amounted to 80 g.

The coated artificial rice had a whiteness of 75 percent and a hardness of 15 g. It contained 21 percent of L-lysine hydrochloride, 10 percent of L-threonine and 5 percent of water. The grains were rice shaped, their surface was smooth and had a desirable lustre, and this rice could hardly be distinguished from natural rice in its appearance and taste even when cooked after being mixed with natural rice in an amount of about 1 percent.

EXAMPLE 2

750 g. of powder of nonglutinous rice which had passed through a 100-mesh sieve and 210 g. of L-lysine hydrochloride were put into a kneader and mixed well with stirring. After the mixture was kneaded with 250 ml. of water for 15 minutes, its starch content was semigelatinized by heating at 100° C. for 30 minutes, and it was mixed well with 80 g. of a solution containing 10 percent of carboxymethylcellulose. The resulting mixture was put into a macaroni-form granulator and formed into rice-shaped grains which were dried to a water content below 5 percent.

The obtained rice grains could hardly be distinguished from natural rice in their appearance and had a hardness of 8 g. This artificial rice was coated by being sprayed with an alcohol solution containing 10 percent of shellac in a pancoating machine for 4 hours.

When the coated artificial rice was washed with water and cooked after being mixed with natural rice in an amount of 1 percent, it lost very little of its amino acids upon washing, and the appearance and taste of the cooked rice could hardly be distinguished from natural rice.

What we claim is:

1. A method of producing artificial rice which comprises:

a. kneading a mixture of powdered rice with at least one nutrient amino acid and with an amount of water sufficient to make the water content of the resulting mixture 20 to 50 percent, whereby a paste is produced.
 1. The amino acid content of said mixture being 15 to 50 percent of the weight of solids in said mixture;
b. exposing said paste to steam for a time and at a temperature sufficient to semigelatinize the starch and said powdered rice;
c. shaping the paste containing said semigelatinized starch into grains; and
d. drying said grains to a water content of not more than 15 percent.

2. A method as set forth in claim 1 wherein said paste is exposed to said steam at 90° to 120° C.

3. A method as set forth in claim 2 wherein said amino acid content includes at least one member of the group consisting of L-lysine, L-threonine L-methionine, DL-methionine, L-tryptophan, and DL-tryptophan.

4. A method as set forth in claim 2, wherein said at least one amino acid is a member of the group consisting of L-lysine, L-threonine, L-methionine, DL-methionine, L-tryptophan, and DL-tryptophan.

5. A method as set forth in claim 4 wherein said grains are dried to a water content not substantially smaller than 5 percent.

* * * * *